UNITED STATES PATENT OFFICE.

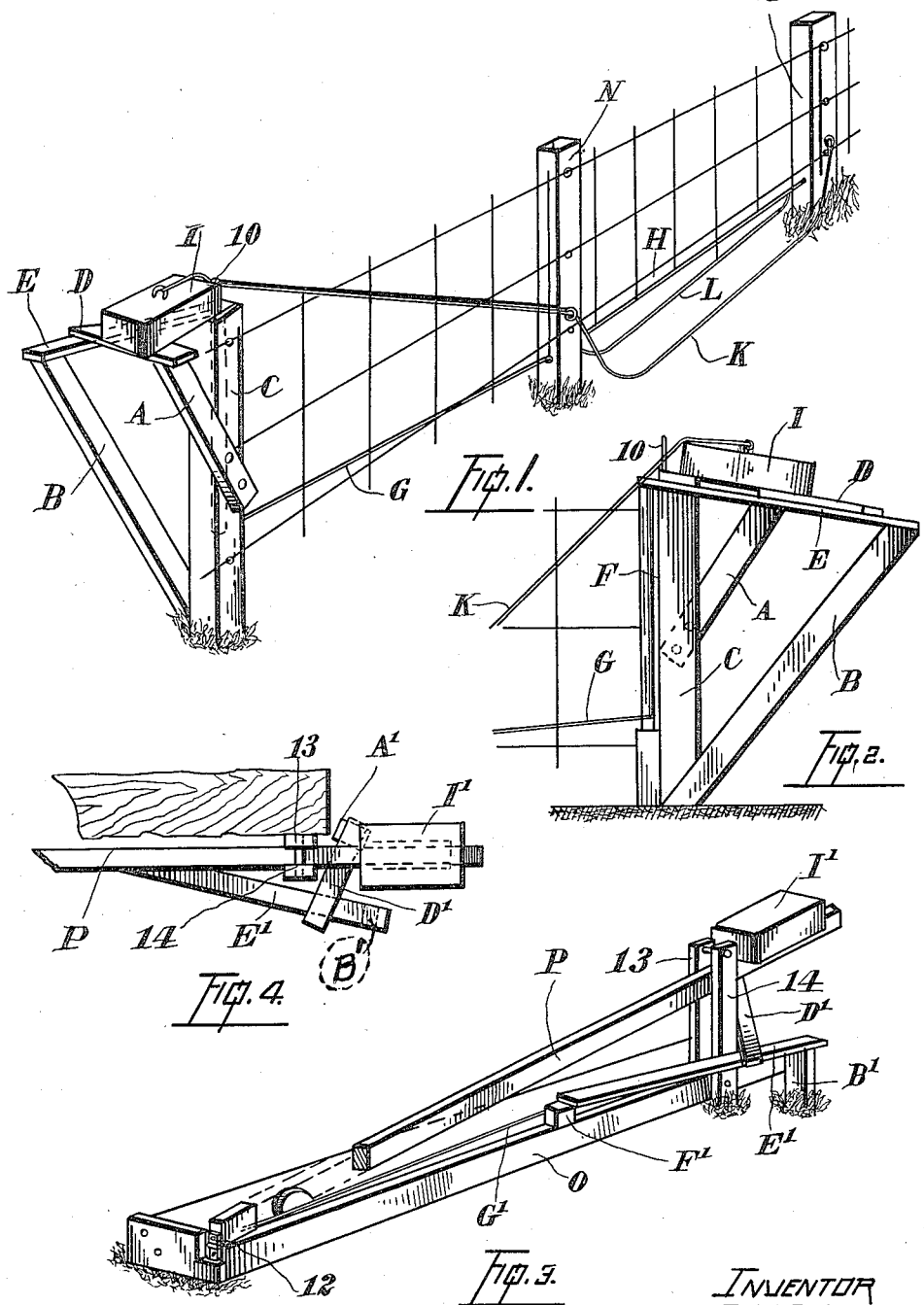

SAMUEL WIEHL, OF SISTERS, OREGON.

DEAD-FALL TRAP.

1,075,235.

Specification of Letters Patent.     Patented Oct. 7, 1913.

Application filed October 3, 1912. Serial No. 723,722.

*To all whom it may concern:*

Be it known that I, SAMUEL WIEHL, a citizen of the United States, residing at Sisters, in the State of Oregon, United States of America, have invented certain new and useful Improvements in Dead-Fall Traps, of which the following is a specification.

This invention relates to improvements in dead fall traps and the objects of the invention are to provide a simple and effective form of trap which may be tripped by an exceedingly light line, but in which, owing to the novel arrangement of the levers, an exceedingly heavy weight may be used which will cause effective operation of the trap in the manner hereinafter set forth and described.

In the drawings, Figure 1 is a perspective view showing the trap set up along a fence. Fig. 2 is a side elevation. Fig. 3 is a perspective view of an alternative form of the invention. Fig. 4 is a plan of the form shown in Fig. 3.

In the drawings like characters of reference indicate corresponding parts in all the figures.

Referring to the drawings, and first to the form shown in Figs. 1 to 3, A and B represent two supporting struts which in this form of the invention are secured to and supported from the fence post C. Loosely resting on top of the strut A is a supporting lever D, the end of which rests on a second supporting lever E whose end is supported on the strut B while the free end of the lever is supported on the tripping pin F, which tripping pin is connected to the trip line G, which trip line extends beneath the wire fence H a distance between the lowest extremity of the fence and the ground where it will likely be engaged by an animal attempting to pass beneath the fence.

I represents the dead fall or weight which is supported on the lever D being near the extremity of the lever which rests on the support A. The weight I is connected to the trap lines K and L which may be conveniently formed of wire and have their extremities connected to the post M, said lines extending also through eyelets on the side of the adjacent post N and through an eyelet 10 on the post C whereby the line between the posts N and M is adapted to lie normally on the ground, but when the weight I falls it will be jerked sharply against the underside of the fence imprisoning the animal which has attempted to pass through.

The weight is adapted to be caused to fall by means of the animal engaging the trip line which pulls the trip pin F away, permitting the weight to fall. In the alternative form shown in Fig. 4 the device is set up along a log O. The weight I is supported on the end of a lever P which has its extremity 12 connected to one extremity of the log as by a hinge, while the upper extremity extends between two guide posts 13 and 14.

The free end of the lever P is adapted to be retained in raised position by means of the lever D one end of which rests on the strut $A^1$ while the opposite extremity rests on the lever $E^1$, one end of the lever $E^1$ being supported by the strut $B^1$ while the other is supported by the trip pin or block $F^1$ to which is connected the trip line $G^1$. The struts $A^1$ and $B^1$ are planted firmly in the ground.

The method of operation is the same as the form shown in Figs. 1 and 2. When the trip line is engaged by an animal the weight is allowed to fall imprisoning the animal between the lever P and the log.

As many changes could be made in the above construction and many apparently widely different embodiments of my invention, within the scope of the claims, constructed without departing from the spirit or scope thereof, it is intended that all matter contained in the accompanying specifications and drawings, shall be interpreted as illustrative and not in a limiting sense.

What I claim as my invention is:

1. In a dead fall trap, a dead fall weight, a plurality of supporting struts and a plurality of levers extending across said struts and resting one on the other, a trip pin supporting the last lever, said last lever constituting a supporting means for said weight, a trip line connected to said trip pin and trapping means operated by the weight.

2. A dead fall trap comprising two spaced struts having two loose levers, each having one end resting on one of the struts and one of the levers having one end resting on the other lever, a trip pin supporting the free end of one of the levers, a trip line connected to the trip pin and a weight supported by one of the levers and trapping means operated by a fall in the weight, as and for the purpose specified.

In witness whereof I have hereunto set my hand in the presence of two witnesses.

SAMUEL WIEHL.

Witnesses:
P. J. LIETHAUSEN,
E. H. HOWELL.

Copies of this patent may be obtained for five cents each, by addressing the "Commissioner of Patents, Washington, D. C."